United States Patent [19]
Nashimoto et al.

[11] Patent Number: 6,009,062
[45] Date of Patent: Dec. 28, 1999

[54] DISC PLAYER FOR MINIDISC AND COMPACT DISC PLAYBACK

[75] Inventors: Hiroaki Nashimoto, Maebashi; Masaya Nawata; Shoji Morioka, both of Gunma-Gun, all of Japan

[73] Assignee: Victor Company of Japan, Ltd., Yokohama, Japan

[21] Appl. No.: 09/090,254

[22] Filed: Jun. 4, 1998

[30] Foreign Application Priority Data

Jun. 4, 1997 [JP] Japan ..................................... 9-146726

[51] Int. Cl.[6] .................................................. G11B 33/02
[52] U.S. Cl. .......................................................... 369/77.2
[58] Field of Search ................................. 369/77.1–77.2, 369/75.1–75.2

[56] References Cited

U.S. PATENT DOCUMENTS

| | | | |
|---|---|---|---|
| 4,575,836 | 3/1986 | Seto | 369/265 |
| 5,539,717 | 7/1996 | Choi | 369/75.2 |
| 5,572,498 | 11/1996 | Choi | 369/77.2 |

FOREIGN PATENT DOCUMENTS

| | | |
|---|---|---|
| 0779617 | 6/1997 | European Pat. Off. . |
| 7-296499 | 11/1995 | Japan . |

*Primary Examiner*—Allen T. Cao
*Attorney, Agent, or Firm*—Jacobson, Price, Holman & Stern, PLLC

[57] ABSTRACT

A disc player for use in playback of both a minidisc and a compact disc is formed with an opening formed on a panel for loading a minidisc and another opening formed on the panel for loading a compact disc. A chassis is provided in an orthogonal direction with respect to the panel. Mounted on the chassis is a turning frame that is horizontally turnable on the chassis. Provided on the turning frame are a rotary unit for rotating the minidisc and another rotary unit for rotating the compact disc. The turning frame is turned horizontally to move at least either the rotary units to a predetermined information reading position. The disc player has a first and a second turntable (rotary unit) on which the minidisc and the compact disc are loaded, respectively, by a loading mechanism. The loading mechanism has a first roller to transfer the compact disc and a second roller the minidisc. The second roller is provided as parallel to the first roller and within a lateral length of the first roller. The minidisc is held by a holder provided as close to the first turntable from the second roller. The first and second rollers are rotated by one actuator.

10 Claims, 16 Drawing Sheets

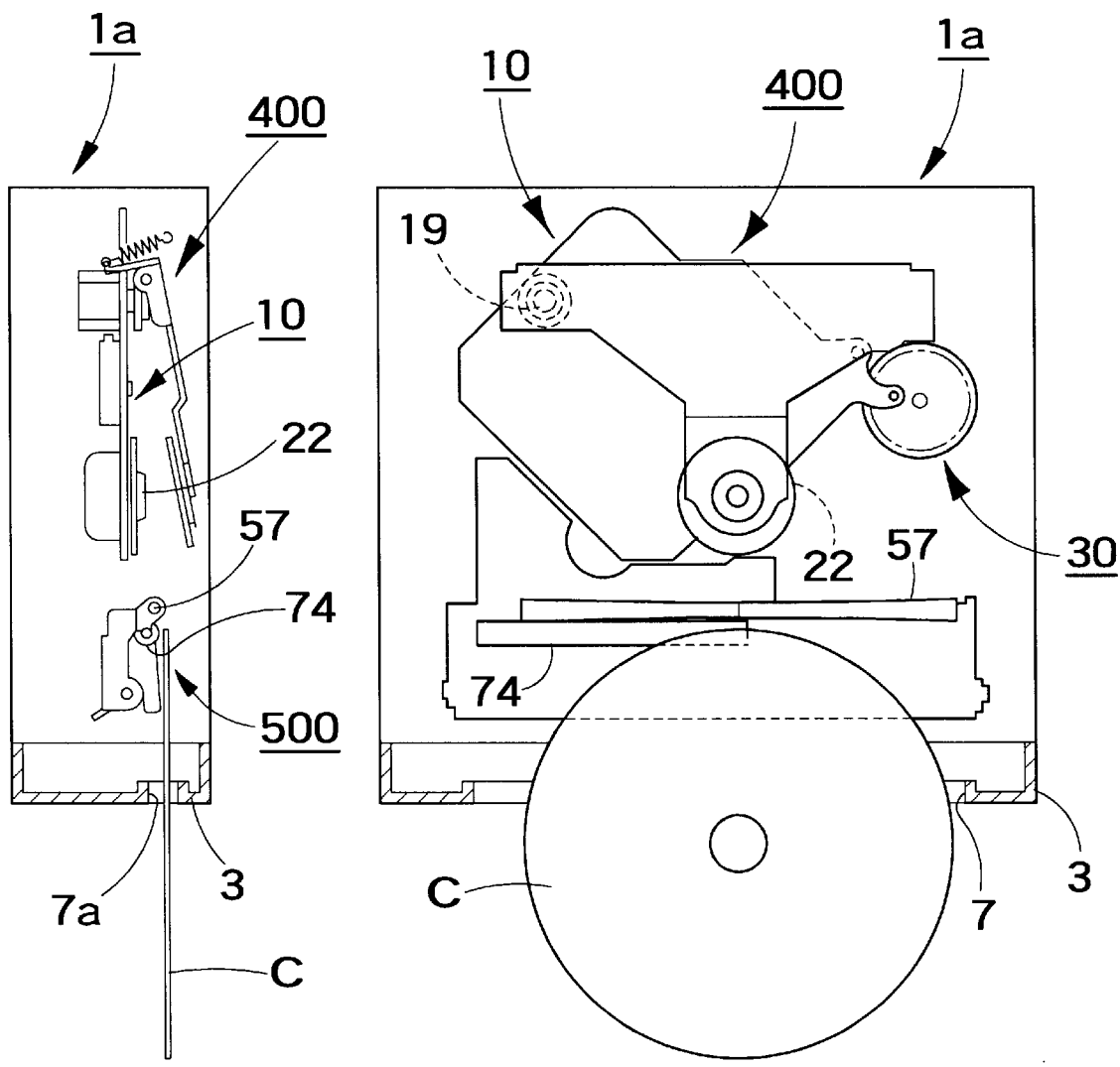
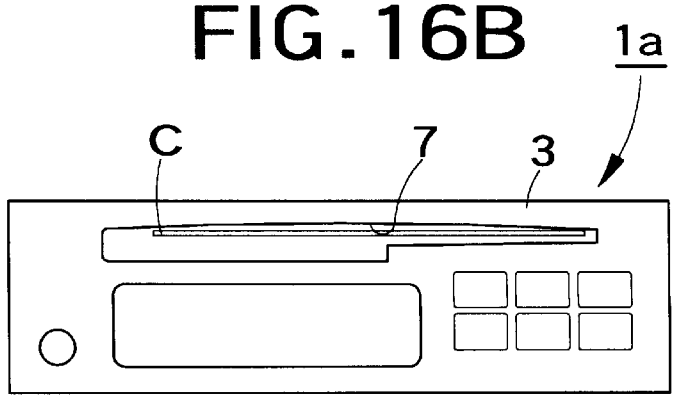
FIG. 16C  FIG. 16B  FIG. 16A

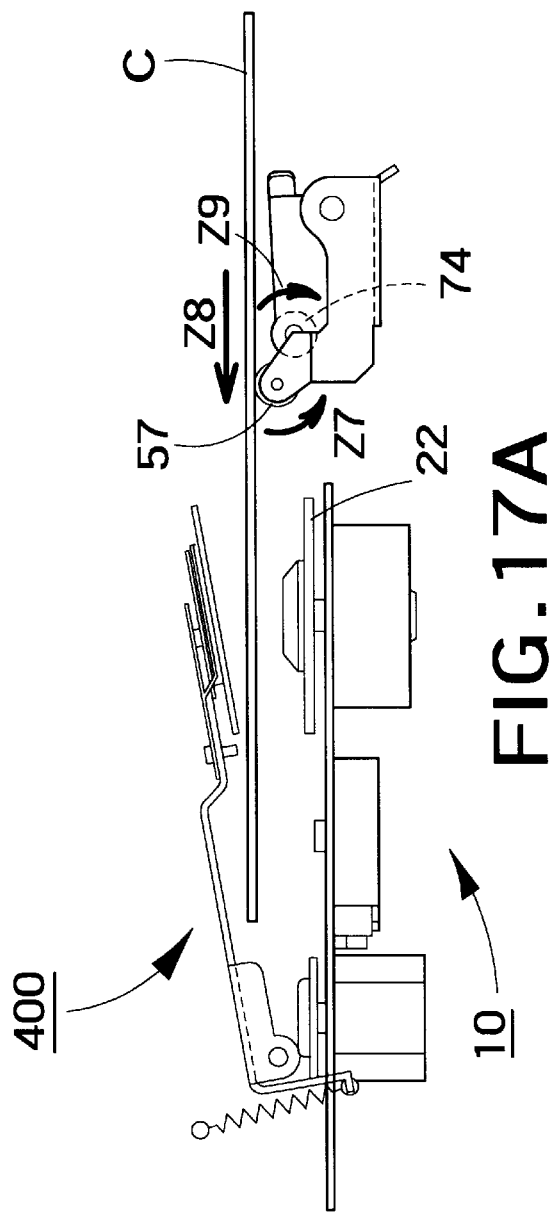
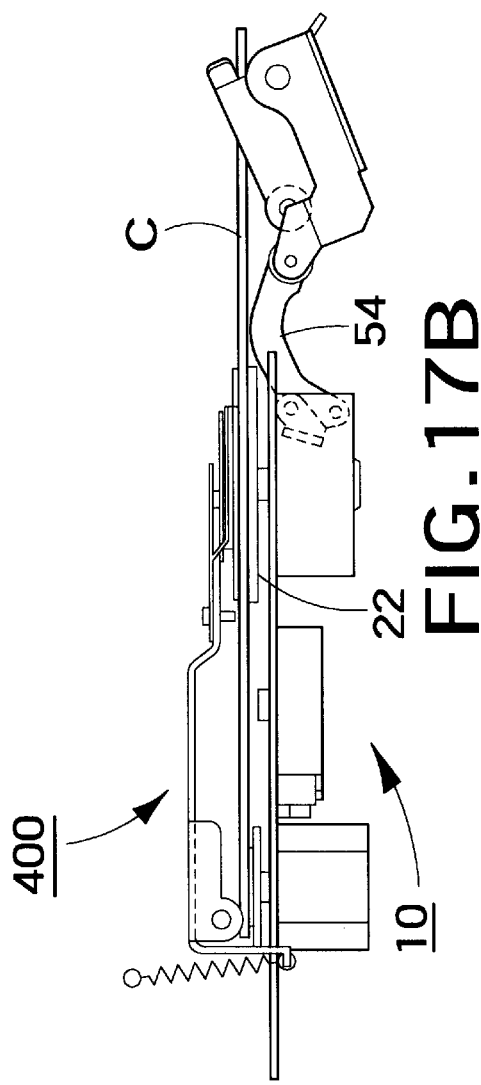

DISC PLAYER FOR MINIDISC AND COMPACT DISC PLAYBACK

BACKGROUND OF THE INVENTION

The present invention relates to a disc player for use in playback of both a minidisc (MiniDisc, MD) and a compact disc (Compact Disc, CD).

FIGS. 1A and 1B show arrangement of a minidisc and a compact disc on a conventional disc player for use in playback of both a minidisc and a compact disc.

In FIG. 1A, a minidisc 100 and a compact disc 101 are arranged side by side on one and the same plane. Reference numeral 100a designates a center hole of the minidisc 100; 100b a shutter of the minidisc 100; 100c a housing of the minidisc; and 101a a center hole of the compact disc.

Let A be the dimension of one side of the housing 100c of the minidisc 100, B the clearance between the minidisc 100 and the compact disc 101, and C the dimension of the outside diameter of the compact disc 101, then the dimension D1 for arranging the minidisc 100 and the compact disc 101 in plane is A+B+C. The dimensions A and B are those determined in accordance with the standard (A=72 mm, C=120 mm). For example, when dimension B is set to 5 mm, dimension D1 needs to be (D1=72 mm+5 mm+120 mm) 197 mm.

The disc player for use in playback of both a minidisc and a compact disc to be mounted on vehicle cannot be mounted on a console box in almost all of vehicles unless they conform with the DIN Standard (West Germany Standard). For example, "1DIN size" set forth in the DIN Standard is 178 mm (width)×53 mm (height) in front panel size, which is outside the "1DIN size" in the above-described arrangement. Therefore, the disc player corresponding to the DIN Standard cannot be prepared.

The inventors of the present application have repeated their studies, and proposed the arrangement of the minidisc 100 and the compact disc 101 by making an optical pickup 103 for use in playback of both a minidisc and a compact disc the smallest dimension.

In FIG. 1B, the minidisc 100 and the compact disc 101 are arranged side by side on one and the same plane. In consideration that the minidisc 100 and the compact disc 101 are not used simultaneously, the pickup 103 provided between the minidisc 100 and the compact disc 101 is miniaturized to the smallest limit whereby the center holes 100a and 101a of the minidisc 100 and the compact disc 101 are brought close to each other so that the distance L1 between the centers in FIG. 1A is changed to the distance L2 between the centers in FIG. 1B.

Let E be the dimension where the minidisc 100 and the compact disc 101 overlap, then dimension D2 is A+C−E, which indicates the dimension shortened by B+E from the dimension D1 (A+B+C) shown in FIG. 1A. With this, D2 is the dimension of more or less 180 mm, which is however not within the "1DIN size".

SUMMARY OF THE INVENTION

A purpose of the present invention is to provide a compact disc player for use in playback of both a minidisc and a compact disc.

The present invention provides a disc player comprising: a first opening formed on a panel for loading a first disc storage medium with a first diameter; a second opening formed on the panel for loading a second disc storage medium with a second diameter longer than the first diameter; a chassis provided in an orthogonal direction with respect to the panel; a turning frame horizontally turnably mounted on the chassis; a first rotary unit provided on the turning frame to rotate the first disc storage medium; a second rotary unit provided on the turning frame to rotate the second disc storage medium; and a rotary mechanism for horizontally turning the turning frame to move at least either the first or the second rotary unit to a predetermined information reading position.

Further, the present invention provides a disc player comprising: a first turntable on which a first disc storage medium with a first diameter is to be loaded; a second turntable on which a second disc storage medium with a second diameter longer than the first diameter is to be loaded; and a loading mechanism for loading the first and second disc storage media onto the first and second turntables, respectively; wherein the loading mechanism comprises: a first roller to transfer the second disc storage medium; a second roller to transfer the first disc storage medium, the second roller being provided as parallel to the first roller and within a lateral length of the first roller; a holder to hold the first disc storage medium, the holder being provided as close to the first turntable from the second roller; and an actuator to actuate the first and second rollers.

Further, the present invention provides a disc player comprising: a first opening formed on a panel for loading a first disc storage medium with a first diameter; a second opening formed on the panel for loading a second disc storage medium with a second diameter longer than the first diameter; a chassis provided in an orthogonal direction with respect to the panel; a turning frame horizontally turnably mounted on the chassis; a first rotary unit provided on the turning frame to rotate the first disc storage medium; a second rotary unit provided on the turning frame to rotate the second disc storage medium; a rotary mechanism for horizontally turning the turning frame to move at least either the first or the second rotary unit to a predetermined information reading position; and a loading mechanism for loading the first and second disc storage media onto the first and second rotary units, respectively; wherein the loading mechanism comprises: a first roller to transfer the second disc storage medium; a second roller to transfer the first disc storage medium, the second roller being provided as parallel to the first roller and within a lateral length of the first roller; a holder to hold the first disc storage medium, the holder being provided as close to the first turntable from the second roller; and an actuator to actuate the first and second rollers.

BRIEF DESCRIPTION OF THE DRAWINGS

FIGS. 16A to 16C illustrate a fourth operation of the loading mechanism of the second embodiment according to the present invention; and FIGS. 17A and 17B illustrate a fifth operation of the loading mechanism of the second embodiment according to the present invention.

DESCRIPTION OF THE PREFERRED EMBODIMENTS

Preferred embodiments of the present invention will now be described in detail with reference to the accompanying drawings.

Figure 1A:
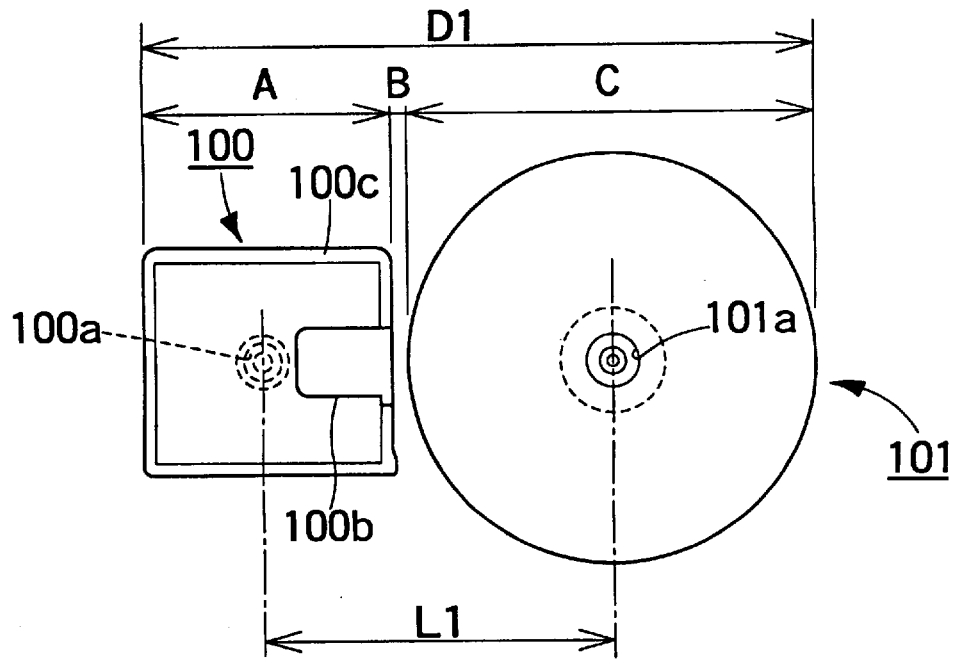
FIGS. 1A and 1B are plan views where a minidisc and a compact disc are arranged on a conventional disc player for use in playback of both a minidisc and a compact disc.
Figure 1B:
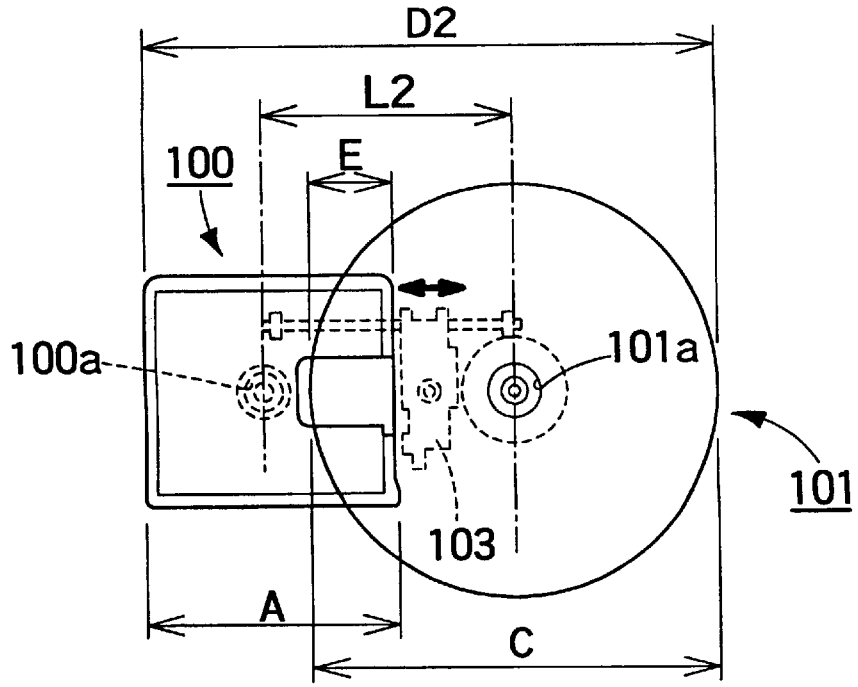
Figure 2:
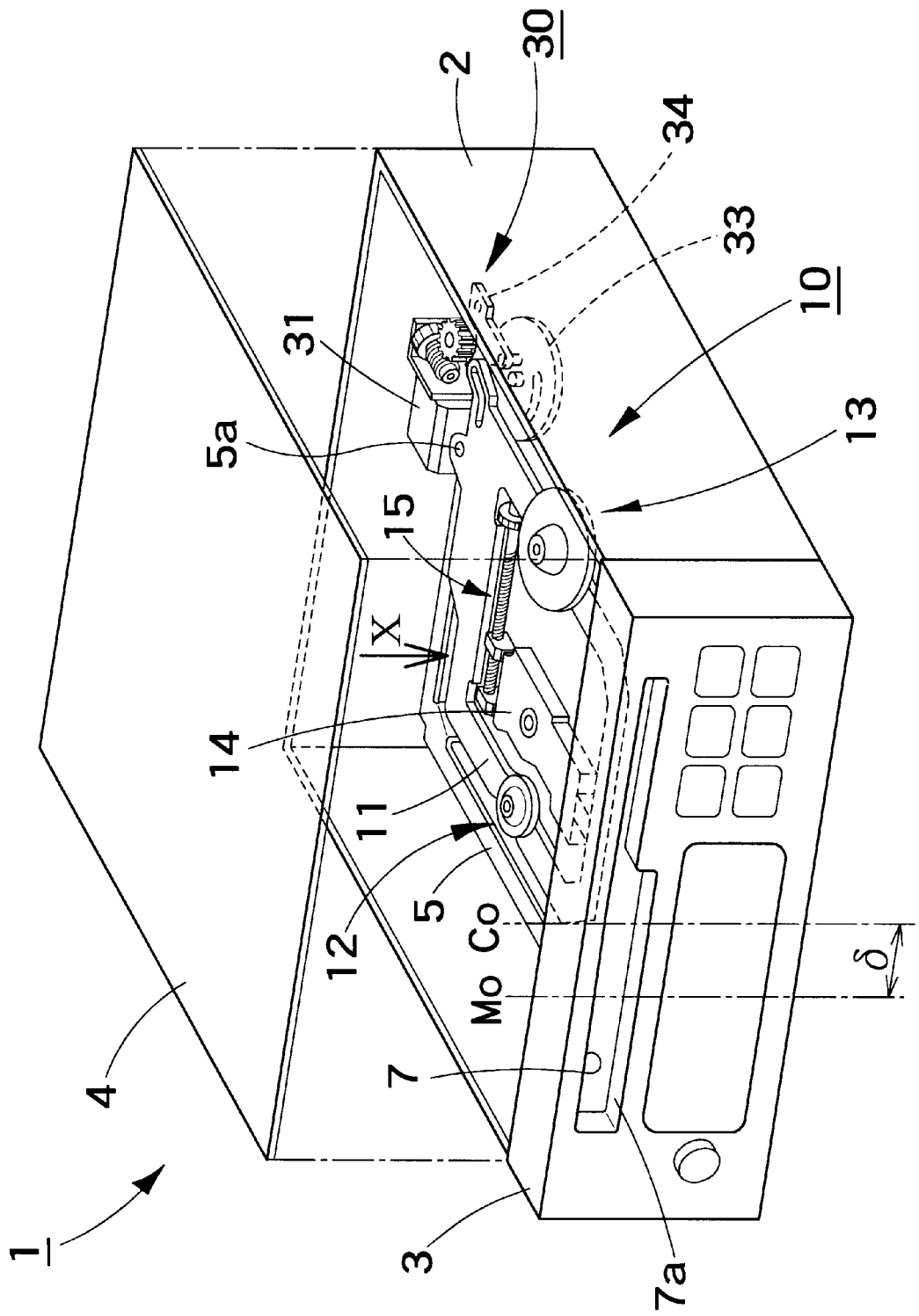
FIG. 2 is a perspective view showing an external appearance of a first embodiment of a disc player for use in playback of both a minidisc and a compact disc according to the present invention.

FIG. 2 shows an external appearance of a disc player 1 (recording and/or reproducing apparatus) for use in playback of both a minidisc (MD, a first disc storage medium) and a compact disc (CD, a second disc storage medium with a diameter longer than that of the first disc storage medium) as a first embodiment according to the present invention.

The disc player 1 is provided with a box-shaped casing 2, a front panel 3 mounted on the front surface of the casing 2, a upper cover 4 covering the upper surface of the casing 2, a floating chassis 5 as a chassis floatably mounted on the casing 2 in an orthogonal direction with respect to the panel 3, a mechanism unit 10 rotatably mounted on the floating chassis 5, and a rotary mechanism 30 for horizontally turning the mechanism unit 10.

The panel 3 is provided with a compact disc loading opening 7, and a minidisc loading opening 7a formed integral with a part of the compact disc loading opening 7. A central position Mo of the minidisc loading opening 7a is formed to be displaced by δ from a central position Co of the compact disc loading opening 7.

The floating chassis 5 is provided with a support 5a for supporting the mechanism unit 10 so that the unit 10 can be turned horizontally.

Figure 3:
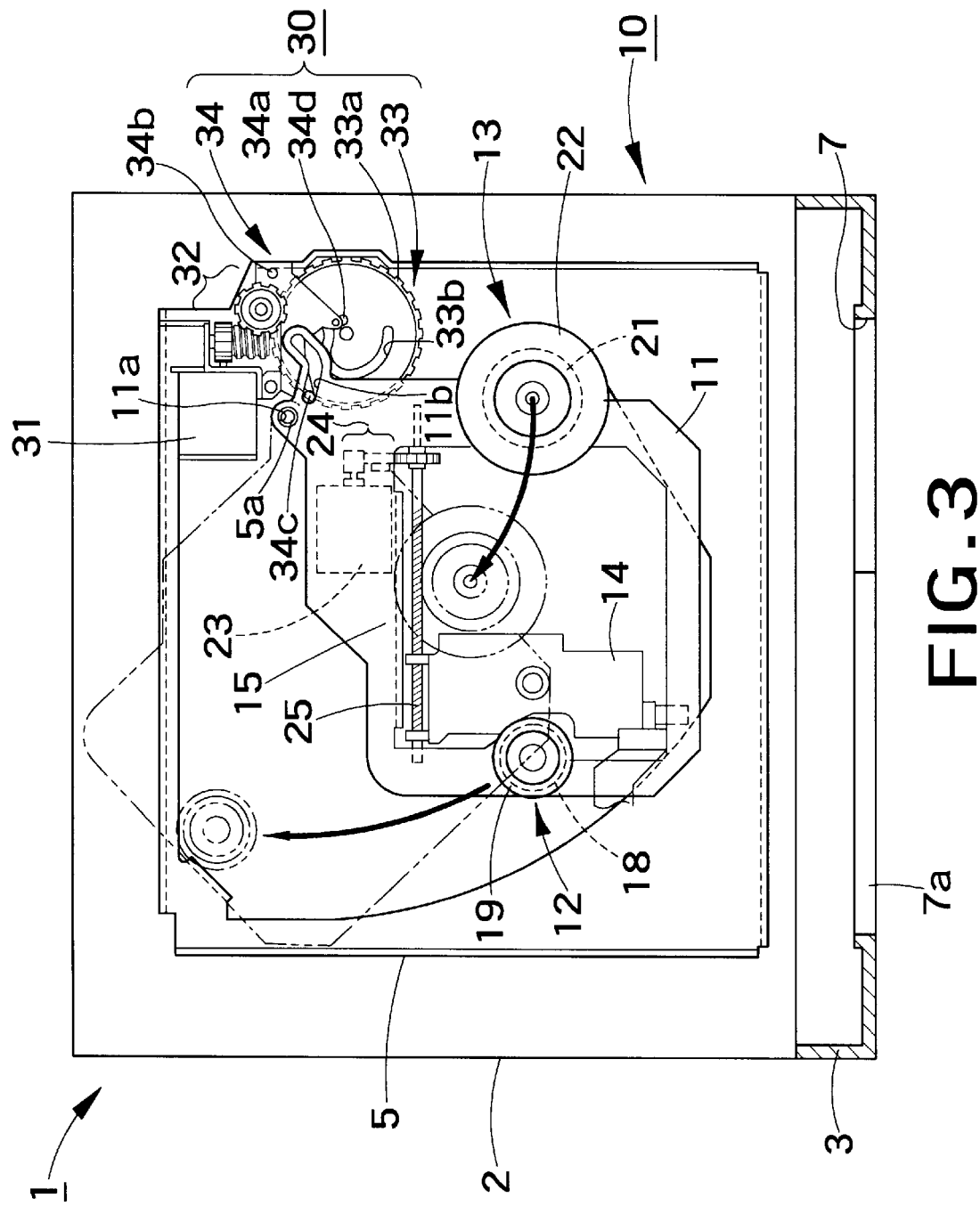
FIG. 3 is a view taken by an arrow X in FIG. 2.

FIG. 3 is a view taken by an arrow X in FIG. 2, showing the plane of disc player 1 with the upper cover 4 of FIG. 2 removed.

The mechanism unit 10 is provided with a substantially rectangular-shaped turning frame 11; a rotary unit 12 for a minidisc, provided on the frame 11; a rotary unit 13 for a compact disc, provided opposite to the rotary unit 12; an optical pickup 14 for use in playback of both a minidisc and a compact disc, movable between the rotary units 12 and 13; and a feed mechanism 15 for driving the pickup 14.

The turning frame 11 is provided with a hole 11a fitted into a support 5a of the floating chassis 5, and a cam groove 11b fitted into the rotary mechanism 30. The rotary unit 12 for a minidisc is provided with a motor 18 mounted on the turning frame 11, and a turntable 19 mounted on the motor 18. The rotary unit 13 for a compact disc is provided with a motor 21 mounted on the turning frame 11, and a turntable 22 mounted on the motor 21.

The feed mechanism 15 is provided with a feed motor 23 mounted on the turning frame 11, and a feed screw 25 for moving the pickup 14 connected to the feed motor 23 through a group of gears 24. The rotary mechanism 30 is provided with a motor 31 mounted on the floating chassis 5, a cam gear 33 connected to the motor 31 through a group of gears 32, and a transmission lever 34 for transmitting the movement of the cam gear 33 to the turning frame 11.

The cam gear 33 is provided with a gear 33a meshed with the group of gears 32, and a cam groove 33b fitted into the transmission lever 34. The transmission lever 34 is provided with a plate-like lever body 34a, a support 34b rotatably mounted on the floating chassis 5, a first pin 34c fitted into the cam groove 11b (as a cam follower), and a second pin 34d fitted into the cam groove 33b of the cam gear 33 (as a cam follower).

The motor 31 is driven to rotate the cam gear 33 through the group of gears 32, the transmission lever 34 is rotated by the second pin 34d fitted into the cam groove 33b of the cam gear 33, and the turning frame 11 is horizontally turned by the first pin 34c of the transmission lever 34.

Operations of the disc player 1 will be explained hereinafter.

Figure 4A:
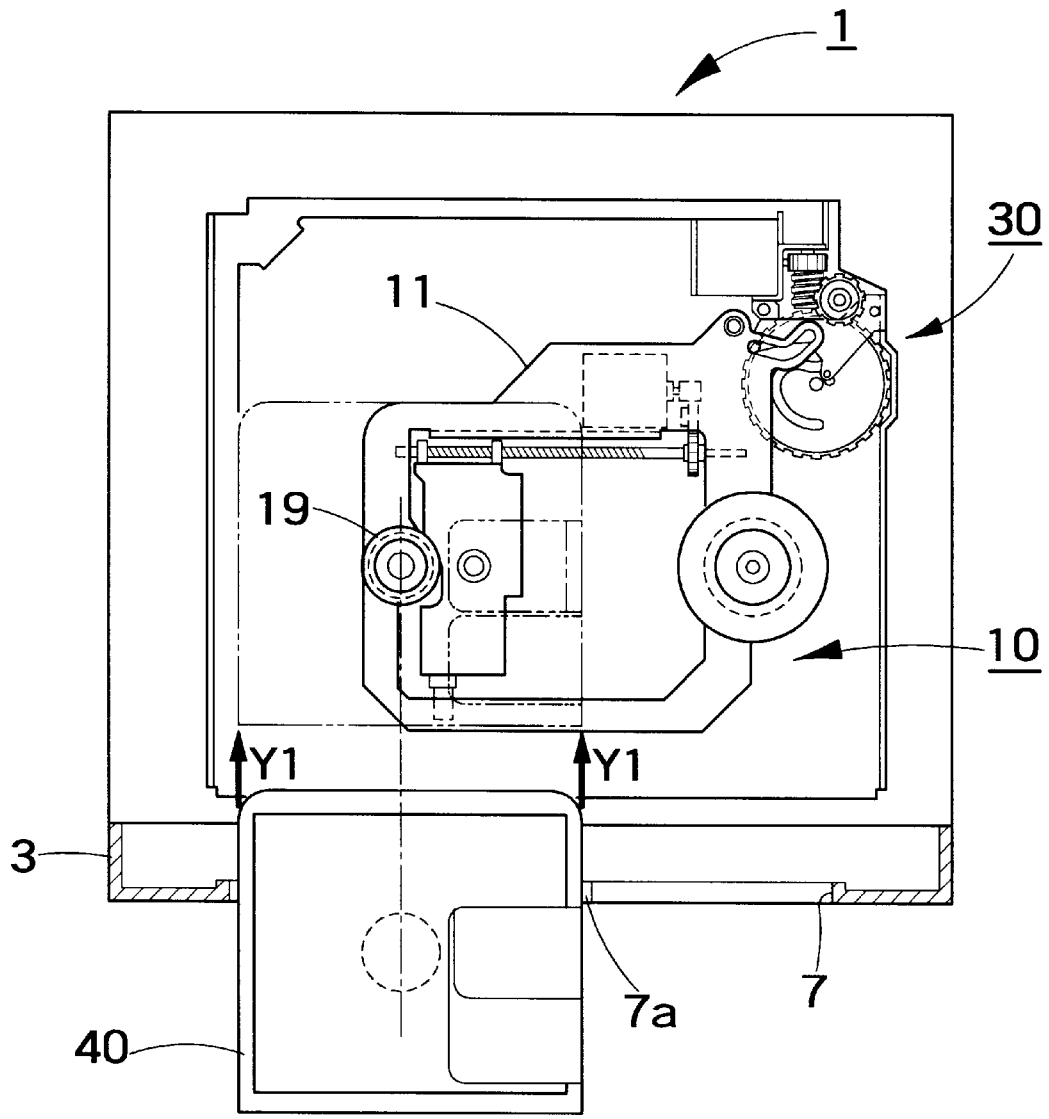
FIGS. 4A and 4B illustrate a first operation of the disc player of FIG. 2 according to the present invention.
Figure 4B:
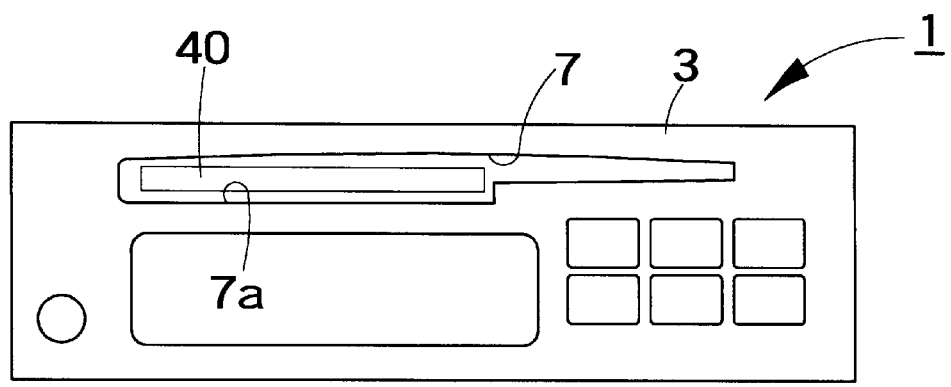

FIGS. 4A and 4B illustrate the first operation of the disc player 1, showing a position of the mechanism unit 10 for reading or recording information of a minidisc 40.

The position of the mechanism unit 10 for reading or recording information of the minidisc 40 is also the position of the mechanism unit 10 in the initial state. When the minidisc 40 is loaded from the minidisc loading opening 7a as indicated by an arrows Y1, the minidisc 40 is detected by a detection switch not shown to maintain the initial state.

Since the minidisc 40 is controlled in the lateral position with respect to the panel 3 by the minidisc loading opening 7a, the position of the minidisc 40 coincides with that of the turntable 19 in the lateral direction.

Figure 5A:
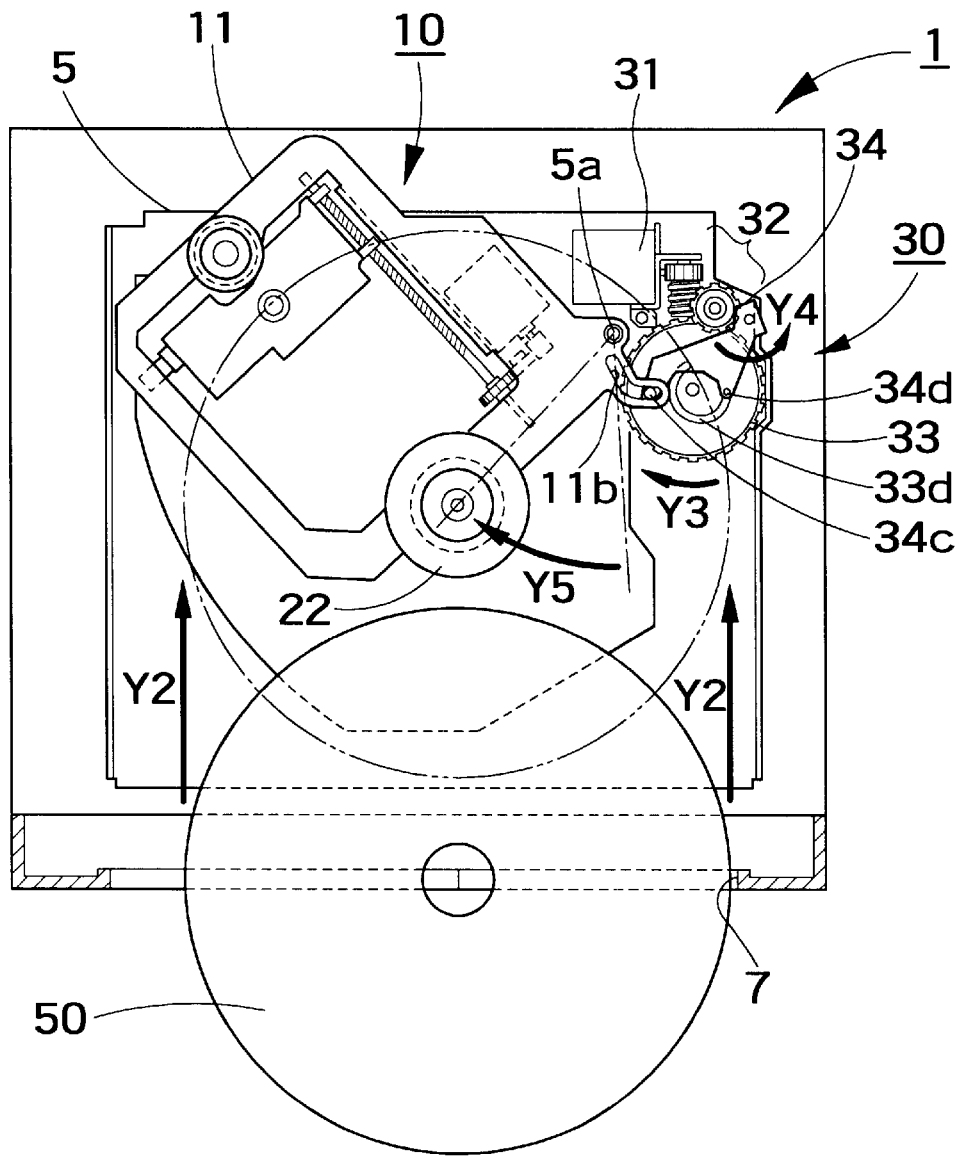
FIGS. 5A and 5B illustrate a second operation of the disc player of FIG. 2 according to the present invention.
Figure 5B:
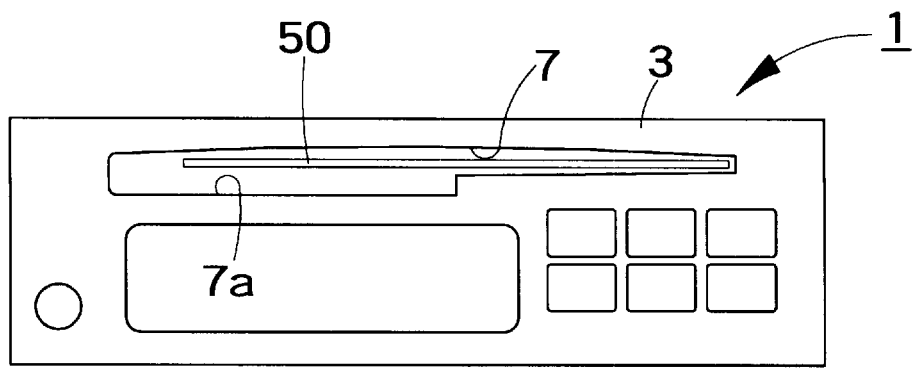

FIGS. 5A and 5B illustrate the second operation of the disc player 1, showing a position of the mechanism unit 10 for reading information of a compact disc 50.

When the compact disc 50 is loaded from the compact disc loading opening 7 as indicated by arrows Y2, the compact disc 50 is detected by a detection switch not shown. The motor 31 is driven to rotate the cam gear 33 through the group of gears 32 as indicated by an arrow Y3, and the transmission lever 34 is rotated as indicated by 5 an arrow Y4 by the second pin 34d fitted into the cam groove 33b of the cam gear 33. The rotary frame 11 is rotated as indicated by an arrow Y5 about the support 5a of the floating chassis 5 by the first pin 34c of the transmission lever 34, and a read position on the compact disc 50 is moved to a substantially central position of the compact disc 50 loading opening 7. This achieves miniaturization of disc player 1 for use in playback of both a minidisc and a compact disc.

The compact disc 50 is loaded from the inserting opening 7 and thereby subjected to centering onto the turntable 22 by a centering mechanism not shown.

Figure 6:
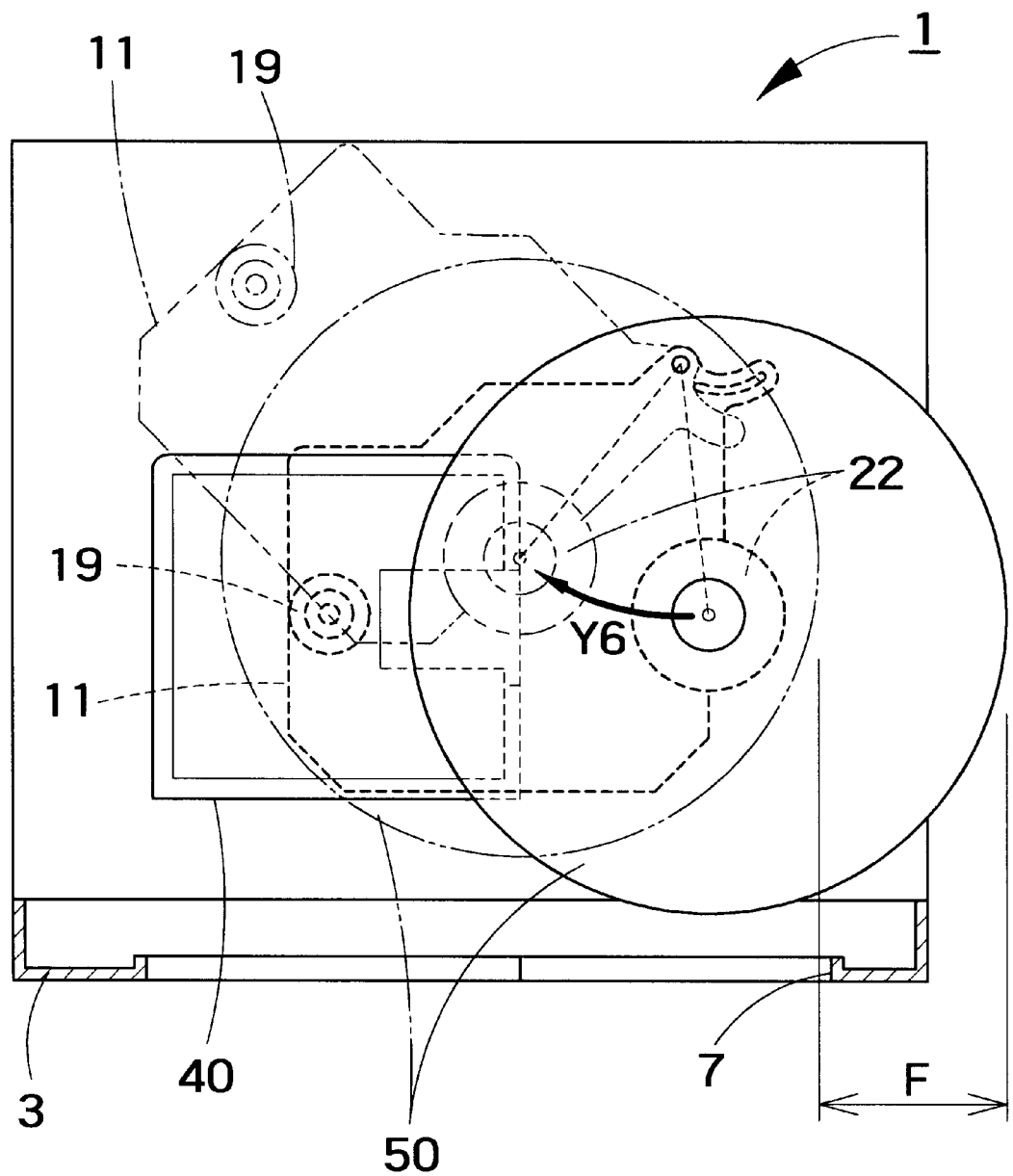
FIG. 6 illustrates a third operation of the disc player of FIG. 2 according to the present invention.

FIG. 6 illustrates the third operation of the disc player 1, showing the comparison of the spacing between a case where the turning frame 11 is rotated to a predetermined position in order to read information on the compact disc 50 and another case where the turning frame 11 is not rotated.

Positions of the turntable 22 and the compact disc 50 when the turning frame 11 has been rotated to the predetermined position are shown by the dash-dotted contour lines. A position of the turntable 22 when the turning frame 11 has not been rotated is shown by the broken lines, and a position of the compact disc 50 when the turning frame 11 has not been rotated is shown by the solid line.

The position of the compact disc 50 where the turning frame 11 has been rotated to the predetermined position is substantially in the central position with respect to the loading opening 7 of the compact disc 50, whereas the position of the compact disc 50 where the turning frame 11 has not been rotated is close to the right as viewed in the drawing with respect to the loading opening 7 and is therefore outside the minidisc 40 and the disc player 1.

That is, since the turning frame 11 is rotatable to the predetermined position as indicated by arrow Y6, the disc player 1 can be miniaturized by dimension F laterally of the panel 3. Thereby, the disc player for use in playback of both a minidisc and a compact disc or use on vehicles in conformity with the DIN standard can be achieved.

A second embodiment according to the present invention will be described. Elements in this embodiment that are the same as or analogous to elements in the foregoing embodiment are referenced by the same reference numerals and will not be explained in detail.

Figure 7:
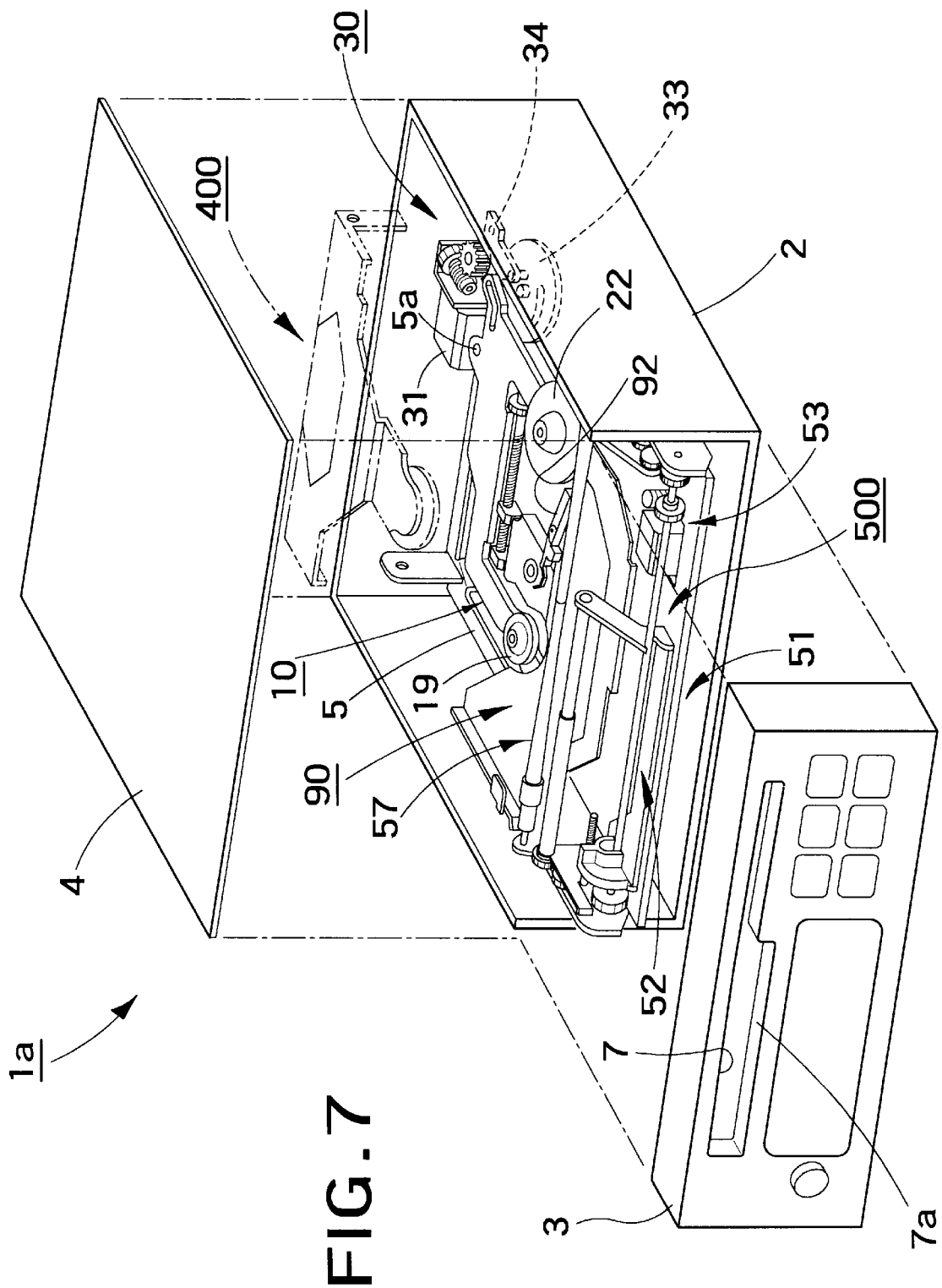
FIG. 7 is a perspective view showing an external appearance of a second embodiment of a disc player for use in playback of both a minidisc and a compact disc according to the present invention.

FIG. 7 shows an external appearance of a disc player 1a also for use in playback and/or recording of both a minidisc (MD, a first disc storage medium) and a compact disc (CD, a second disc storage medium with a diameter longer than that of the first disc storage medium) according to the present invention.

In addition to the elements shown in FIG. 2, the disc player 1a of FIG. 7 is provided with a clamp unit 400 and a loading mechanism 500. The clamp unit 400 clamps a minidisc (MD) cartridge containing a minidisc. The loading mechanism 500 loads a compact disc or a minidisc into the disc player 1a through the compact disc loading opening 7 or the minidisc loading opening 7a.

Figure 9:
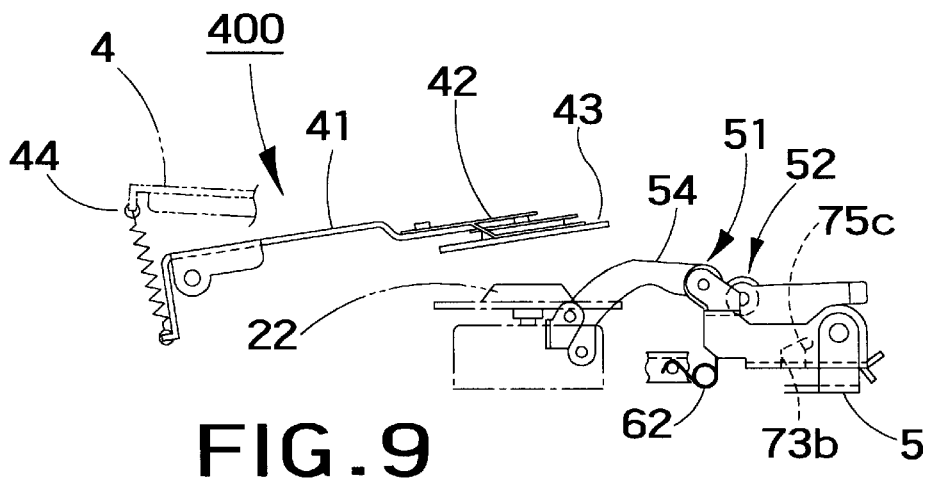
FIG. 9 is a side view showing the clamp unit and the loading mechanism of FIG. 8 according to the present invention.
Figure 10:
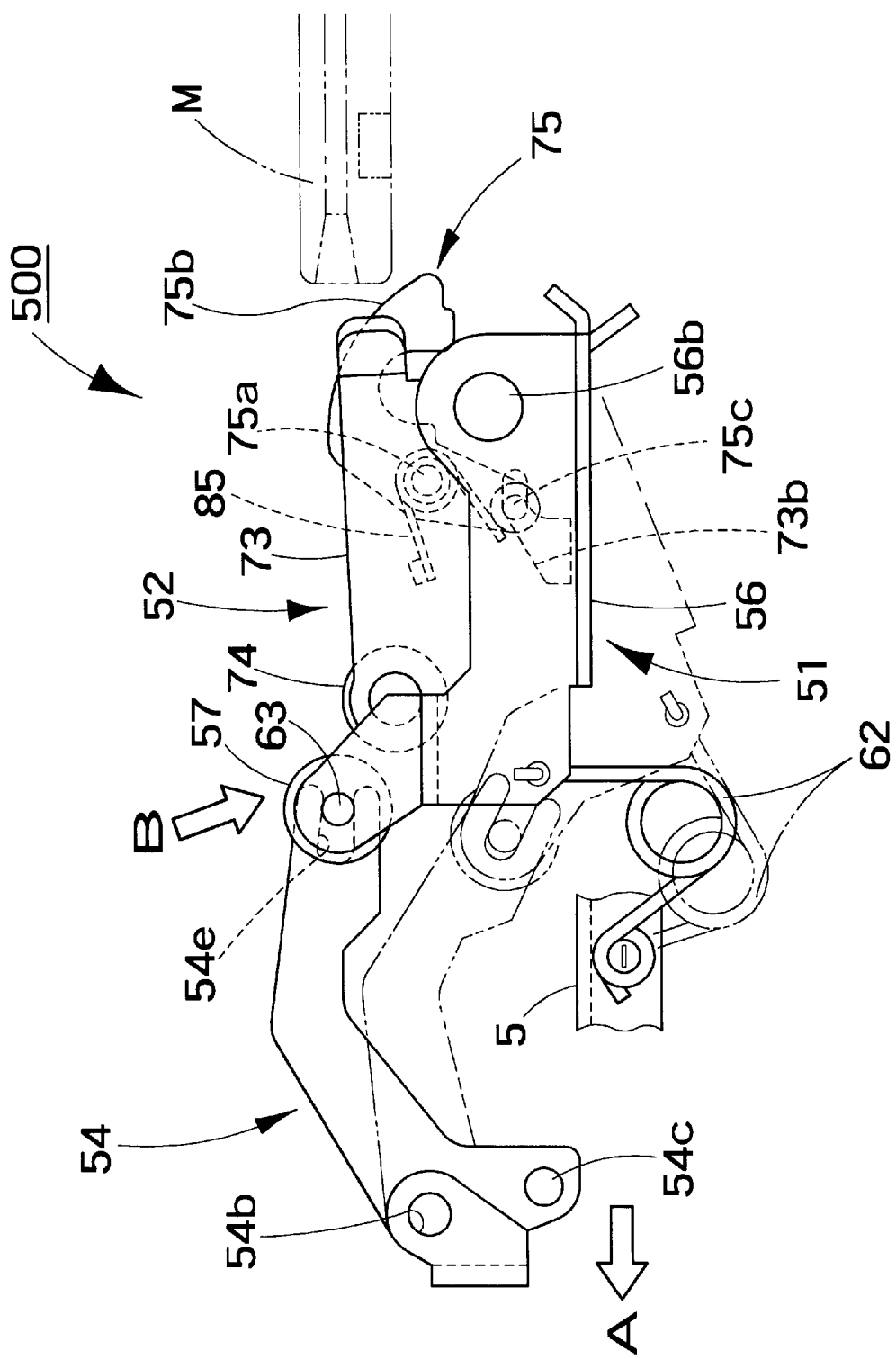
FIG. 10 is another side view showing the loading mechanism according to the present invention.

The clamp unit 400 and the loading mechanism 500 are explained with reference to FIGS. 8, 9 and 10.

The clamp unit 400 is provided with a clamp holder 41 rotatably (within a specific angle) attached at its one end to the floating chassis 5; a flat spring 42 attached to the other end of the clamp holder 41; a clamper 43 rotatably attached to the flat spring 42; extension springs 44 bridged over the upper cover 4 and the clamp holder 41; and an actuator (not shown) for actuating the clamp holder 41.

The loading mechanism 500 is provided with a first roller unit 51 rotatably attached to the floating chassis 5; a second roller unit 52 rotatably attached to the first roller unit 51; an actuator 53 for rotating the roller units 51 and 52; a rotary lever (level adjuster) connected to the first roller unit 51; and a minidisc holder 90 located close to the turntable 19 from the second roller unit 52.

The first roller unit 51 is provided with a first roller frame 56 rotatably (within a specific angle) attached to the floating chassis 5; a first roller 57 rotatably provided between side plates of the first roller frame 56; and a transmission shaft unit 58 rotatably attached to the first roller frame 56.

The first roller frame 56 is provided with intermediate gears 59 and 61 linked to the transmission shaft 58 and a reversal spring 62 bridged over the first roller frame 56 and the floating chassis 5. The first roller frame 56 is formed with a hole 56a for connection to the second roller unit 52. Supporters 56b support the first roller frame 56 as rotatably attached to the floating chassis 5.

The first roller 57 is provided with a roller shaft 63; a long rubber roller 64 with a concave middle portion rotatably attached to one end of the roller shaft 63; a free roller 65 rotatably attached to the rubber roller 64 at one end thereof, with a slightly larger diameter than that of an end portion of the rubber roller 64; and a final gear 66 attached to the other end of the roller shaft 63. The first roller 57 is long enough to transfer a large compact disc with a diameter of 12 cm.

The transmission shaft unit 58 includes a shaft 68; a drive gear 69 attached to the shaft 68; and transmission gears 71 and 72 attached to both ends of the shaft 68.

The second roller unit 52 is located inside the first roller frame 56. The second roller unit 52 is provided with a second roller frame 73 rotatably attached to the shaft 68 via collar (not shown); a second roller 74 rotatably provided between left and right side plates of the second roller frame 73; and a hinge lever 75 for leaping up the second roller frame 73. The second roller 74 is short enough to transfer an MD cartridge and provided as parallel to the first roller 57 within a lateral length thereof.

The second roller frame 73 has an intermediate gear 77 linked to the transmission shaft 58 via the transmission gear 72. A protrusion 73a is fitted into the hole 56a of the first roller frame 56. The hinge lever 75 is fitted in a groove 73b.

The second roller 74 is provided with a roller shaft 79; a resin roller 81 attached to the roller shaft 79; a rubber roller 82 by which the resin roller 81 is partially covered from an end thereof; and a final gear 83 attached to an end of the roller shaft 79 at rubber roller side.

The hinge lever 75 is provided with a shaft 75a rotatably attached to the first roller frame 56; a lever 75b operated by loading an MD cartridge; and an operating portion 75c for leaping up the second roller frame 73.

A torsion spring 85 is bridged over the lever 75b and the first roller frame 56, for returning back the hinge lever 75 to its initial position.

The actuator 53 is provided with a motor 86 attached to the floating chassis 5; a worm gear 87 attached to a shaft 86a of the motor 86; and a link gear 88 engaged with the worm gear 87. The link gear 88 is further engaged with the drive gear 69.

The disc player 1a is provided with only one actuator 53 for actuating both the first roller 57 for transferring a compact disc and the second roller 74 for transferring an MD cartridge.

The second roller 74 is shorter than the first roller 57 and provided therealong for compactness and lightness of the loading mechanism 500.

The loading mechanism 500 is explained with reference to FIG. 10.

The rotary lever 54 is provided with a U-groove 54a in which the roller shaft 63 is fitted; a pivot 54b rotatably attached to the floating chassis 5; and a drive pin 54c fitted in an actuator (not shown). The supporters 56b for rotatably supporting the first roller frame 56 and the shaft 68 for rotatably supporting the second roller frame 73 are arranged coaxially.

Lateral slide of the drive pin 54c in a direction indicated by an arrow A by the actuator (not shown) rotates the rotary lever 54 around the pivot 54b. Rotation of the rotary lever 54 makes the first roller frame 56 turn around the pivot 54b with the second roller frame 73 in a direction indicated by an arrow B to be displaced by means of the reversal spring 62 as indicated by a chain double-dashed line.

The relationship between the second roller frames 56 and 73 and the hinge lever 75 is explained with reference to FIG. 11.

Figure 11:
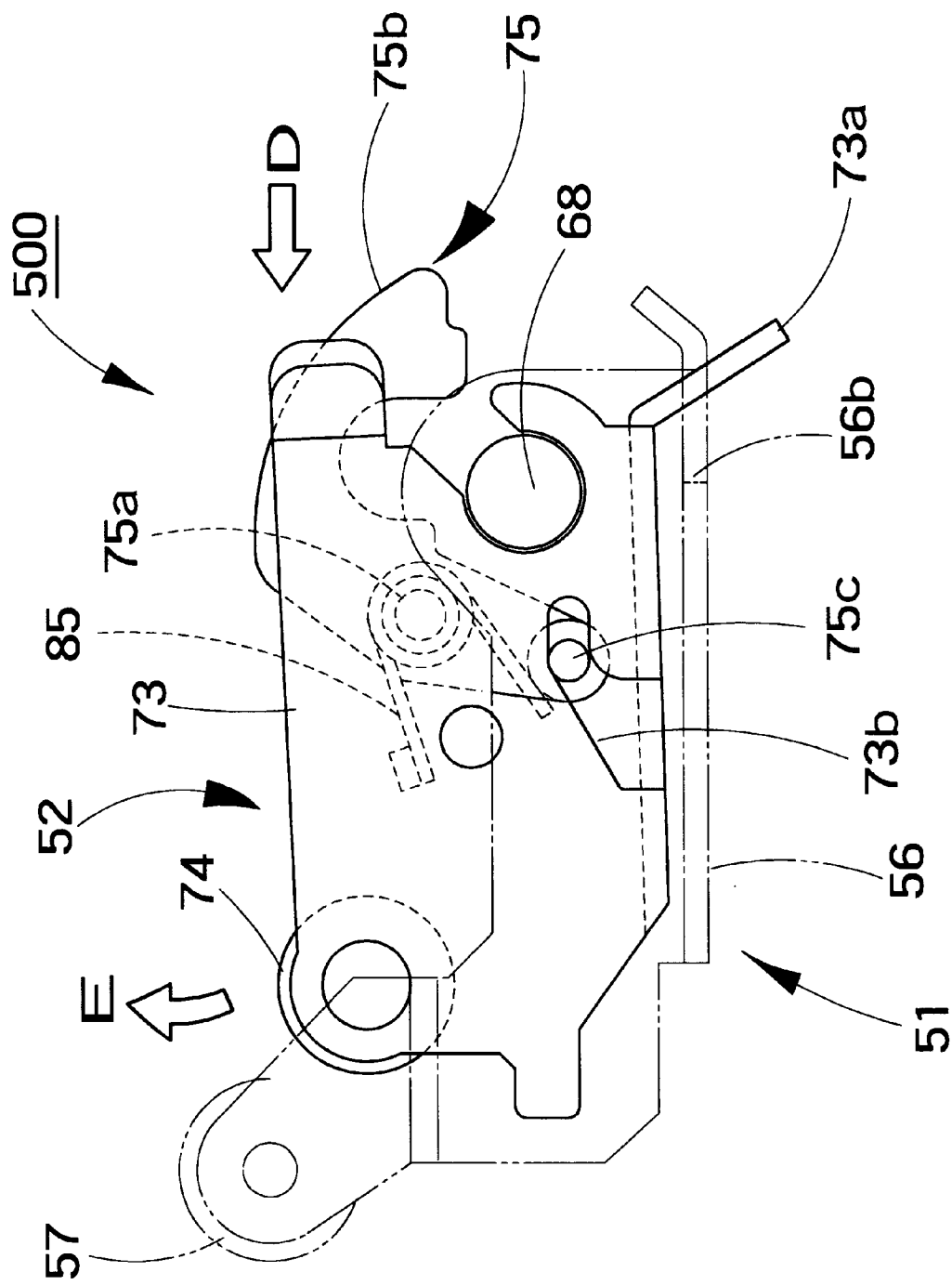
FIG. 11 is a side view showing essential portions of the loading mechanism according to the present invention.

FIG. 11 depicts the second roller frame 73 rotatably attached to the transmission shaft 58 via collar (not shown) and the protrusion 73a fitted in the hole 56a.

The operating portion 75c is fitted in the groove 73b and turns around the shaft 75a in a counter clockwise direction by a force applied to the lever 75b in a direction indicated by an arrow D. Rotation of the operating portion 75c makes the second roller frame 73 to turn around the shaft 68 in a direction indicated by an arrow E. The second roller frame 73 thus leaps up to touch the hole 56a at its protrusion 73a to let the first roller frame 56 leap up. Release of the force applied in the direction of arrow D makes the first roller frame 56 return to its initial position with the torsion spring 85 bridged over the lever 75b and the first roller frame 56.

Figure 12:
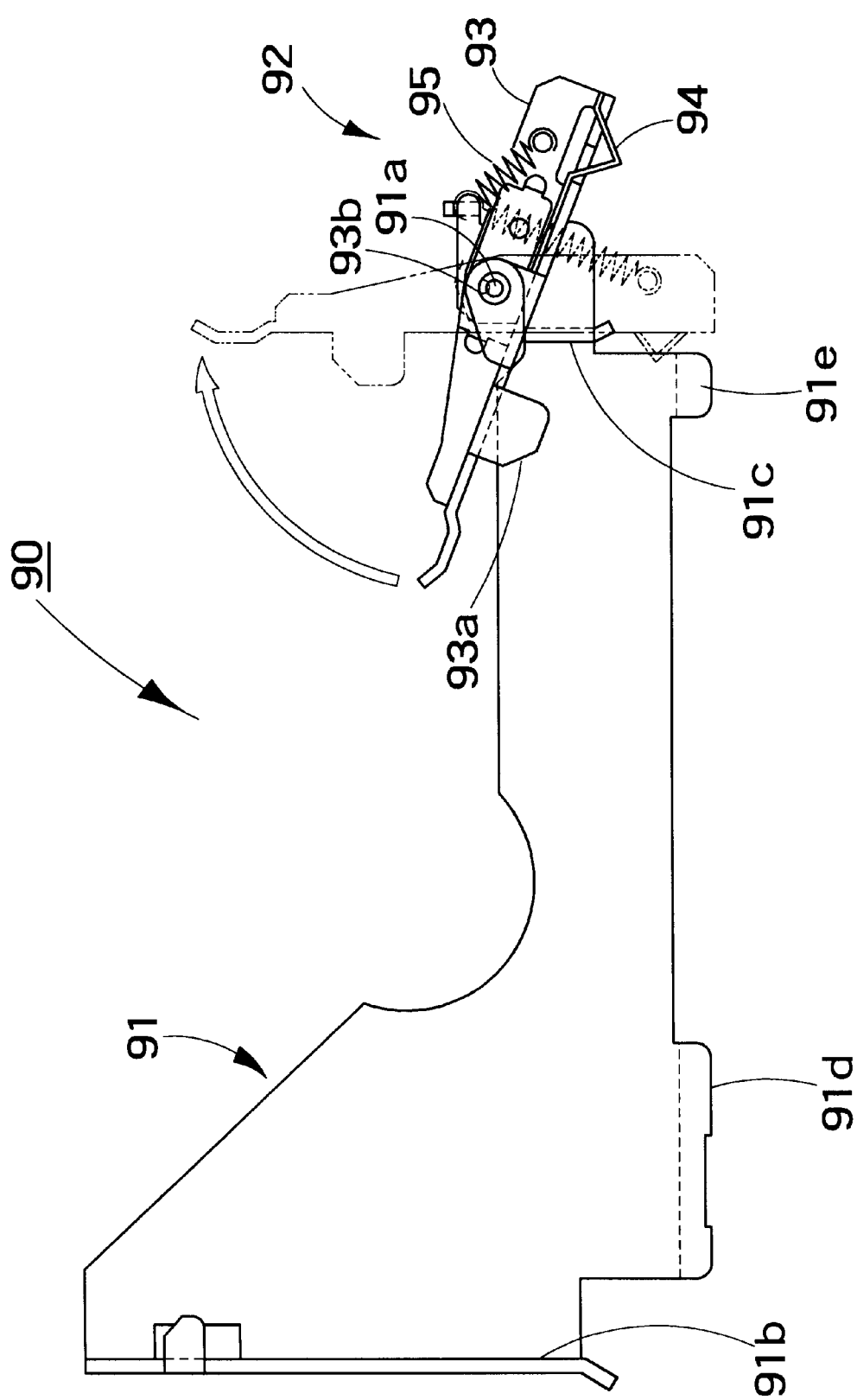
FIG. 12 is a plan view showing a minidisc holder according to the present invention.

The minidisc holder 90 is explained with reference to FIG. 12.

The minidisc holder 90 includes a holder 91 and a shutter operating unit 92 rotatably attached to the holder 91.

The holder 91 is provided with a supporting shaft 91a of the shutter operating unit 92; side guides 91b and 91c for guiding side faces of an MD cartridge; and front guides 91d and 91e for smooth loading of the MD cartridge.

The shutter operating unit 92 is provided with an operating holder 93 rotatably (within a predetermined range) attached to the supporting shaft 91a; a shutter operating spring 94 attached to the operating holder 93; and a torsion spring 95 bridged over the holder 91 and the operating holder 93. The operating holder 93 has a lock release 93a for an MD cartridge and a hole 93b for accepting the supporting shaft 91a.

A first operation of the loading mechanism 500 is explained with reference to FIGS. 13A to 13C.

Figures 13B, 13C:
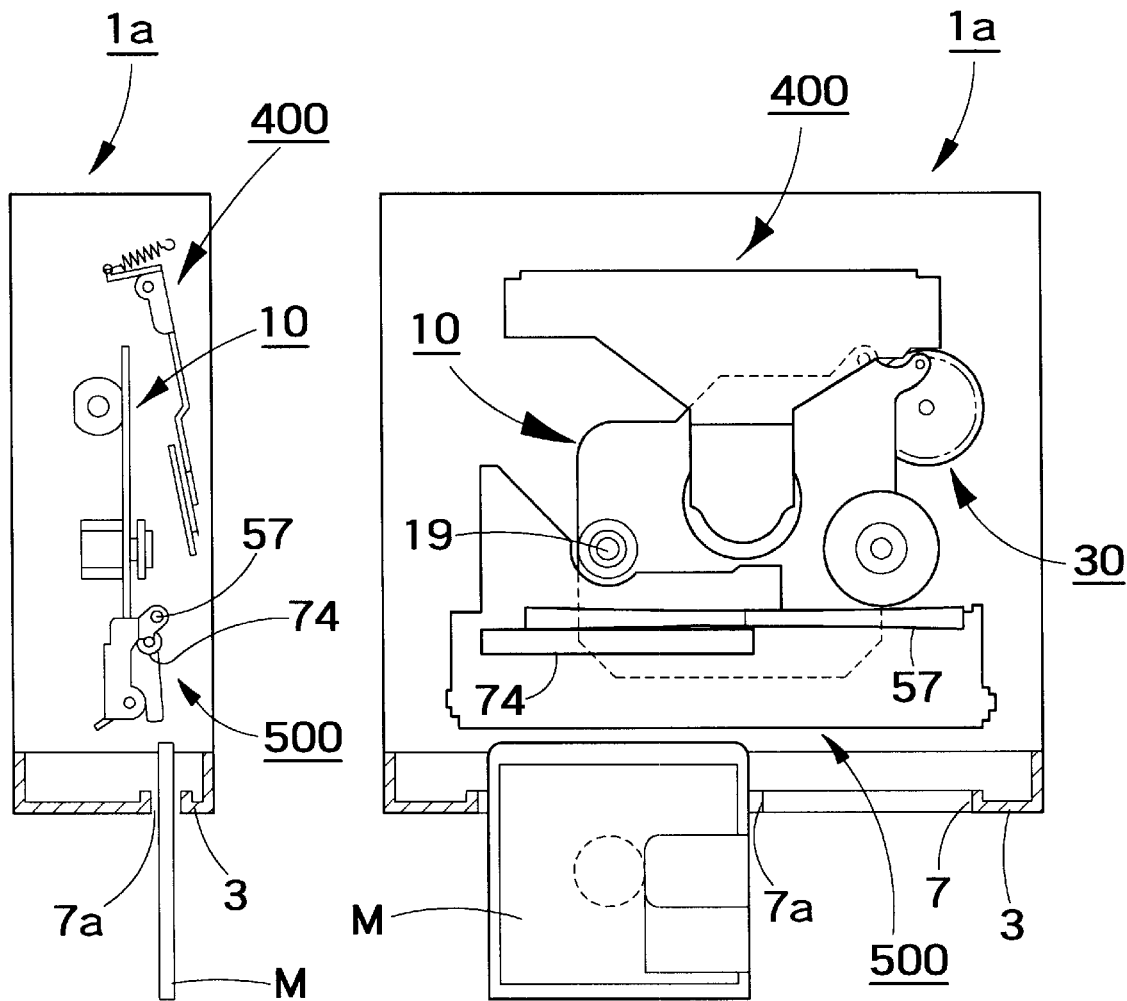
FIGS. 13A to 13C illustrate a first operation of the loading mechanism of the second embodiment according to the present invention.
Figure 13A:
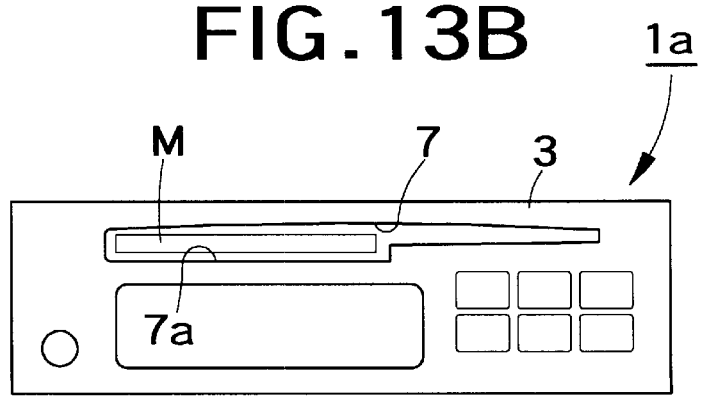

FIG. 13A illustrates a state in that an MD cartridge M can be loaded into the disc player 1a only through the minidisc loading opening 7a not the compact disc opening 7.

FIG. 13B illustrates a state in that the mechanism unit 10 is positioned where the MD cartridge M can be loaded into the disc player 1a. FIG. 13B further illustrates a state in that lateral positions of the MD cartridge M and the turntable 19 meet each other by restriction of lateral position of the MD cartridge M through the minidisc loading opening 7a with respect to the front panel 3 as described in the first embodiment.

FIG. 13C illustrates a state in that the MD cartridge M has been loaded just in front of the loading mechanism 500.

A second operation of the loading mechanism 500 is explained with reference to FIGS. 14A to 14C.

Figure 14A:
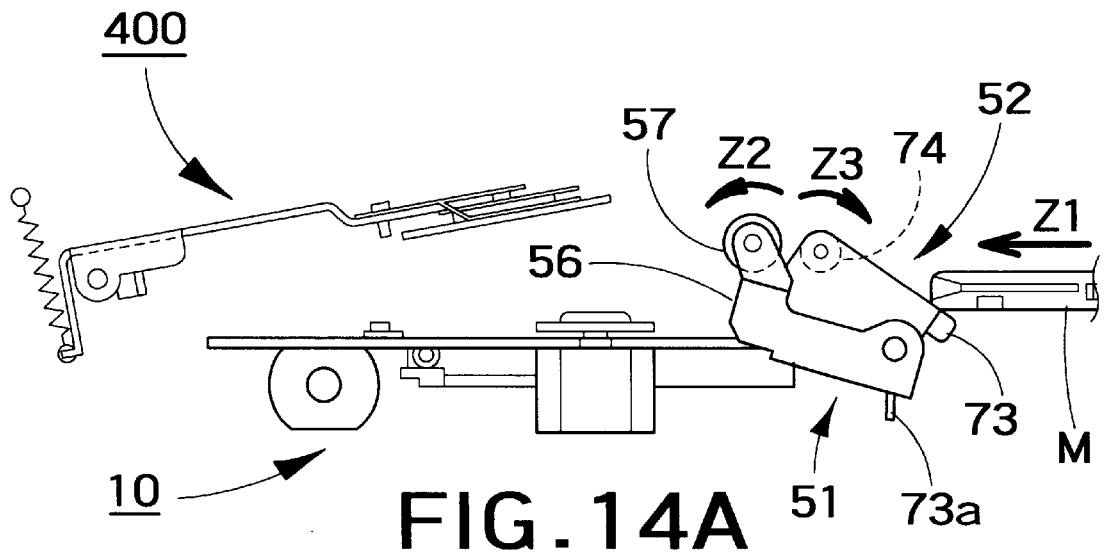
FIGS. 14A to 14C illustrate a second operation of the loading mechanism of the second embodiment according to the present invention.

FIG. 14A illustrates a state in that loading of the MD cartridge M in a direction indicated by an arrow Z1 operates the hinge lever 75 (FIG. 11) to leap up the second roller unit 52 to push the first roller unit 51 upward with the protrusion 73a of the second roller unit 52.

Loading of the MD cartridge M into the disc player 1a to a predetermined position is detected by a detection switch (not shown) to rotate the first roller 57 in a direction indicated by an arrow Z2 while the second roller 74 in the opposite direction indicated by an arrow Z3.

Figure 8:
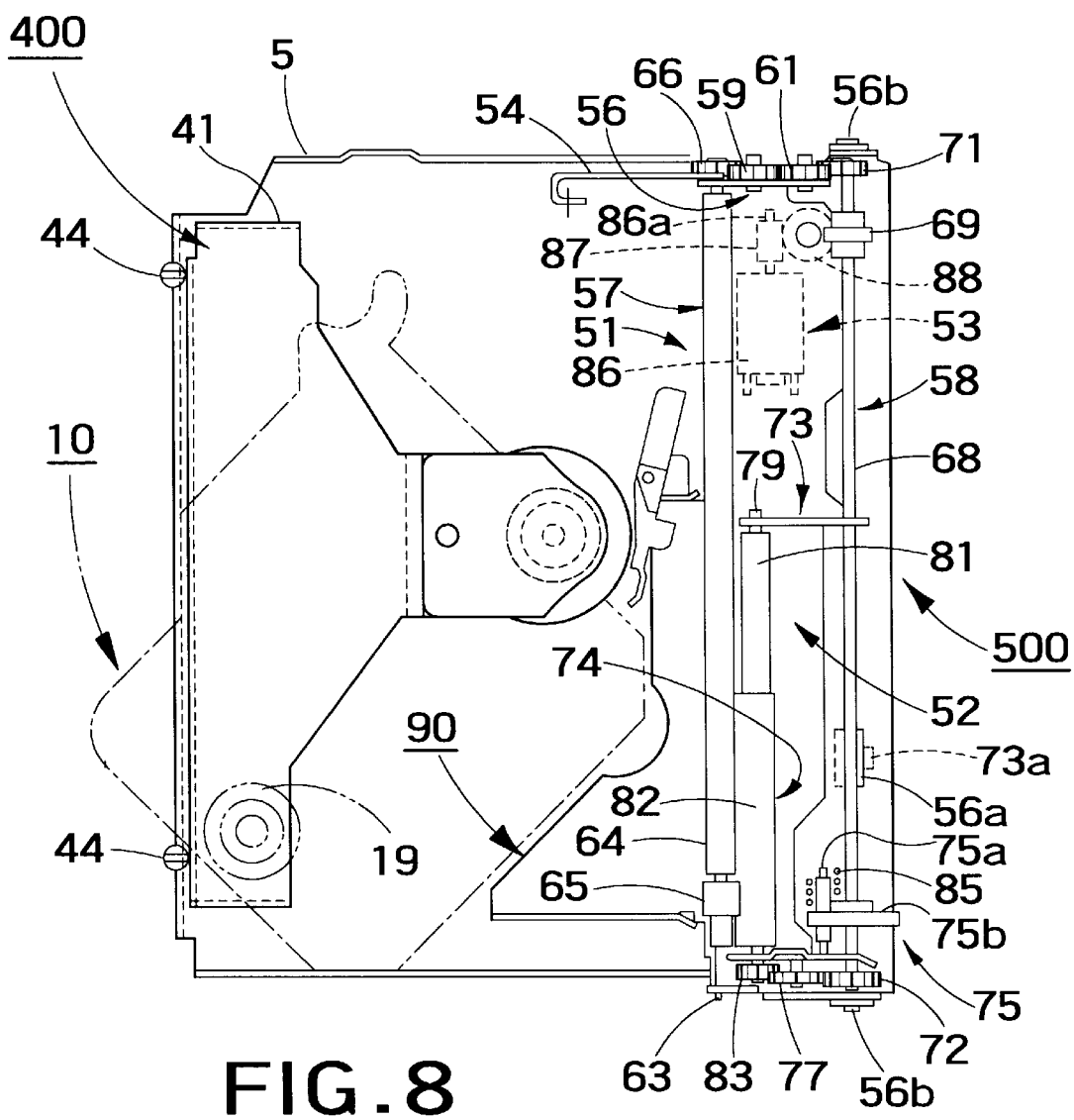
FIG. 8 is a plan view showing a clamp unit and a loading mechanism of the disc player of FIG. 7 according to the present invention.

The first and second rollers 57 and 74 always rotate in opposite directions due to difference in construction such that the first roller unit 51 has the two intermediate gears 59 and 61, whereas the second roller unit 52 only one intermediate gear 77 as shown in FIG. 8.

Figure 14B:
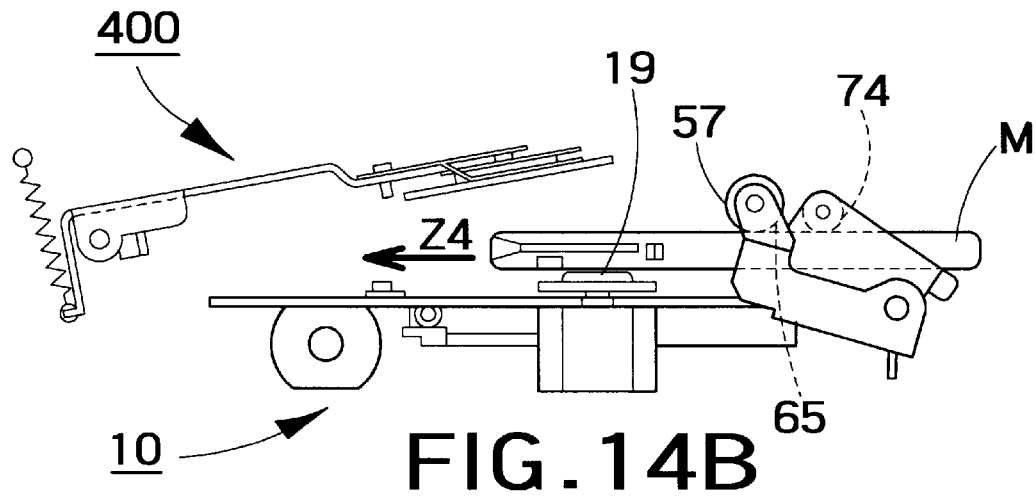

FIG. 14B illustrates a state in that the second roller 74 touches the upper surface of the MD cartridge M to transfer the MD cartridge M in a direction of the turntable 19. The MD cartridge M is further transferred in a direction indicated by an arrow Z4 while pushing the second roller 74 upward. The first roller 57 rotates in the opposite direction with respect to the second roller 74. However, the transfer of the MD cartridge M is free from the existence of the first roller 57 due to the construction in that the first roller 57 has a free roller 65 touching the upper surface of the MD cartridge M.

Figure 14C:
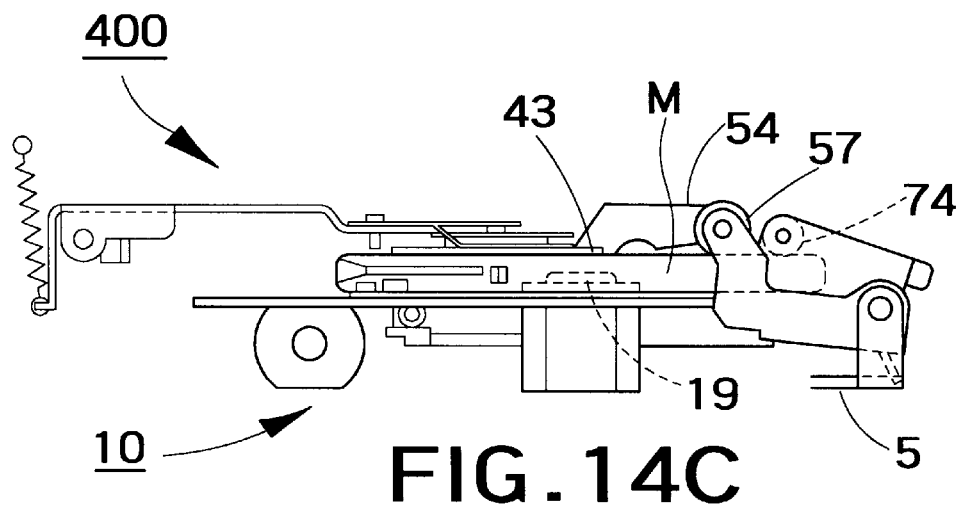

FIG. 14C illustrates a state in that the second roller 74 is stopped after the transfer of the MD cartridge M to the predetermined position to operate the rotary lever 54 for chucking the MD cartridge M on the turntable 19 and rotate the clamp unit 400. The MD cartridge M is clamped by the second roller 74 and the clamper 43 via the rotary lever 54 and the first roller 57. The second roller 74 functions as a clamper after the transfer of the MD cartridge M to the predetermined position due to the construction such that the second roller 74 is attached to the floating chassis 5 side via the first roller 57 and the rotary lever 54 as a level adjuster.

A third operation of the loading mechanism 500 is explained with reference to FIGS. 15A to 15E illustrating a shutter opening operation of the MD cartridge M while transferred.

Figure 15A:
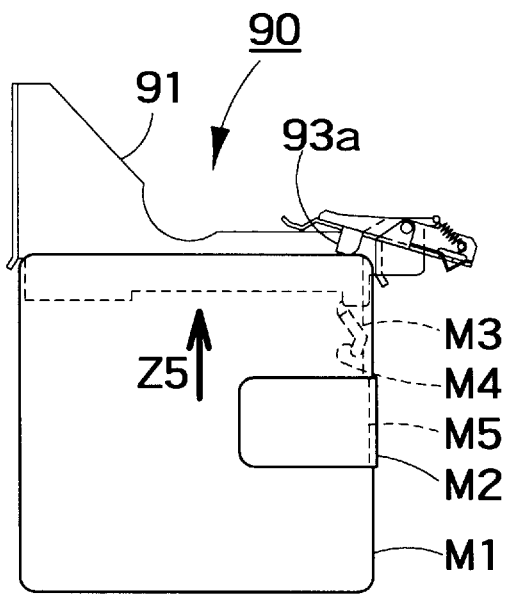
FIGS. 15A to 15E illustrate a third operation of the loading mechanism of the second embodiment according to the present invention.

As shown in FIG. 15A, the MD cartridge M has a housing M1 and a shutter M2 slidably attached to the housing M1. The housing M1 includes a shutter release groove M3 for releasing locking of the shutter M2 and a lock button M4 attached to the shutter release groove M3. The shutter M2 is formed with a hole M5 for transferring the shutter M2.

FIG. 15A illustrates a state in that loading the MD cartridge M into the holder 91 in a direction indicated by an arrow Z5 makes one end of the housing M1 touch the lock release 93a.

Figure 15B:
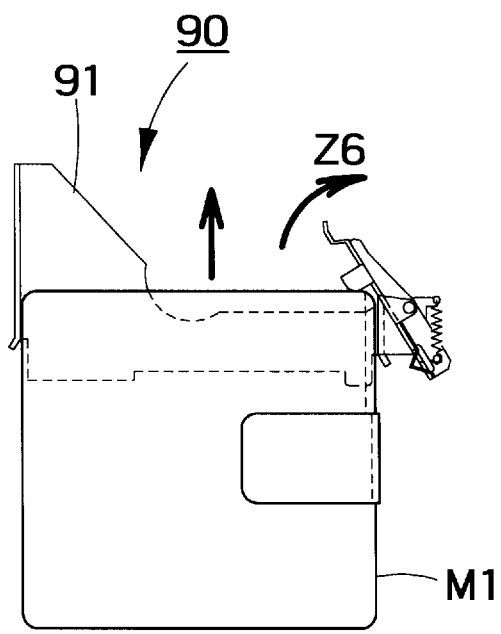

FIG. 15B illustrates a state in that further loading of the MD cartridge M into the holder 91 makes the one end of the housing M1 push the lock release 93a to rotate in a direction indicated by an arrow Z6.

Figure 15C:
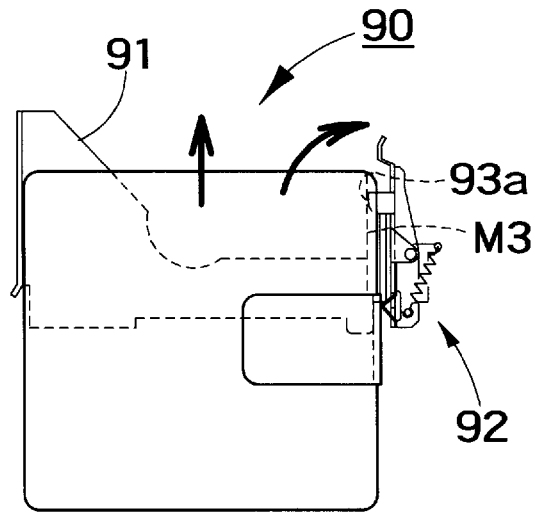

FIG. 15C illustrates a state in that still further loading of the MD cartridge M into the holder 91 makes the shutter operating unit 92 became parallel to a direction in which the MD cartridge M has been loaded, the lock release 93a being fitted in the shutter release groove M3.

Figure 15D:
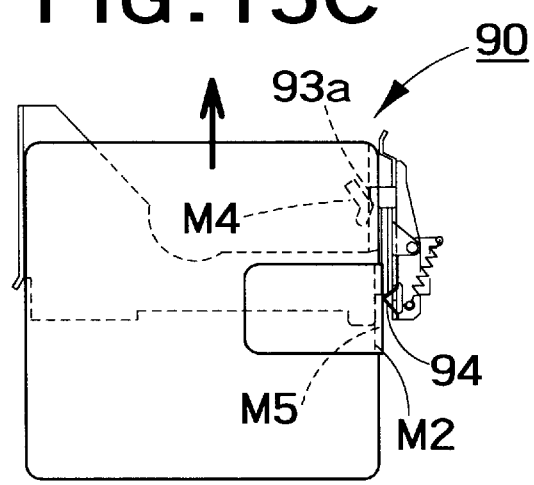

FIG. 15D illustrates a state in that more further loading of the MD cartridge M into the holder 91 makes the lock release 93a push the lock button M4 and the shutter operating spring 94 be fitted in the hole M5 of the shutter M2.

Figure 15E:
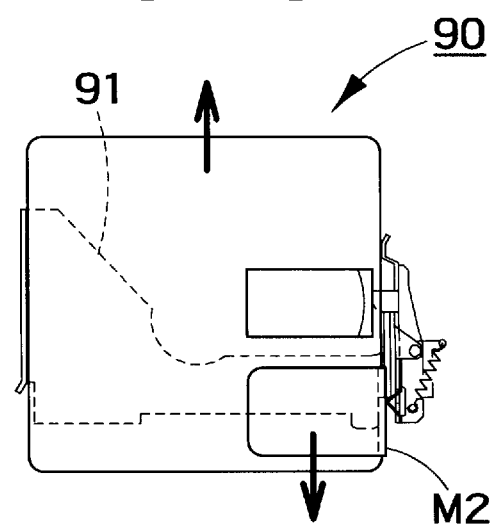

FIG. 15E illustrates a state in that loading of the MD cartridge M into the holder 91 to a predetermined position opens the shutter M2.

The present invention achieves the loading mechanism 50 compact in a depth direction by means of the rotatable shutter operating unit 92 that is pushed upward by the MD cartridge M in use, whereas set at a waiting position while not being used.

A fourth operation of the loading mechanism 500 is explained with reference to FIGS. 16A to 16C illustrating a compact disc C loaded into the disc player 1a through the compact disc loading opening 7 on the panel 3.

FIG. 16A illustrates a state in that the compact disc C can be loaded into the disc player 1a through the compact disc loading opening 7.

FIG. 16B illustrates a state in that the loaded compact disc C is detected by the detection switch (not shown) to make the rotary mechanism 30 to rotate the mechanism unit 10 to a predetermined position as described in the first embodiment.

FIG. 16C illustrates a state in that the compact disc has been loaded just in front of the loading mechanism 500.

A fifth operation of the clamp unit 400 and of the loading mechanism 500 is explained with reference to FIGS. 17A and 17B.

FIG. 17A illustrates a state in that the first roller 57 rotates in a direction indicated by an arrow Z7 to touch the lower surface of the compact disc C to transfer the disc C in a direction indicated by an arrow Z8. The transfer of the compact disc C is free from the existence of the second roller 74 due to the construction such that the second roller 74 is lower than the first roller 57 from the lower surface of the compact disc C even though the second roller 74 rotates in a direction indicated by an arrow Z9 opposite to a rotary direction of the first roller 57.

FIG. 17B illustrates a state in that after the transfer of the compact disc C to a predetermined position, the rotary lever 54 chucks the compact disc C on the turntable 22 and the clamp unit 400 is rotated to clamp the compact disc C.

A small compact disc of 8 cm-diameter also can be transferred by the first roller 57 through processes described with reference to FIGS. 16A to 16C and 17A and 17B.

The first and second roller units 51 and 52 are not only provided as rotatable as a level adjuster but may be slidable in a vertical direction.

According to the present invention, a disc player is formed with an opening formed on a panel for loading a minidisc and another opening formed on the panel for loading a compact disc with a diameter longer than that of the minidisc. A chassis is provided in an orthogonal direction with respect to the panel. Mounted on the chassis is a turning frame that is horizontally turnable on the chassis. Provided on the turning frame are a first rotary unit for rotating the minidisc and a second rotary unit for rotating the compact disc. The turning frame is turned horizontally to move at least either the first or the second rotary unit to a predetermined information reading position.

This configuration enables the miniaturization of the disc player for use in playback of both a minidisc and a compact disc.

The miniaturization of the disc player is further achieved by the arrangement such that a central position of the minidisc loading opening is displaced from another central position of the compact disc loading opening, and the turning frame is horizontally turned so that reading positions of the minidisc and the compact disc correspond to the substantially central positions of the respective loading openings.

Further, according to the present invention, the disc player has a first and a second turntable on which the minidisc and the compact disc are loaded, respectively, by a loading mechanism. The loading mechanism has a first roller to transfer the compact disc and a second roller the minidisc. The second roller is provided as parallel to the first roller and within a lateral length of the first roller. The minidisc is held by a holder provided as close to the first turntable from the second roller. The present invention achieves one actuator for rotating the first and second rollers.

Further, the present invention achieves the loading mechanism compact in a depth direction by means of the rotatable shutter operating unit that is pushed upward in use by an MD cartridge M containing the minidisc in use, whereas set at a waiting position while not being used.

Further, the present invention achieves the second roller for transferring the minidisc functioning as a clamper to clamp a disc cartridge containing the minidisc on the first turntable side by an arrangement in that the second roller is rotated by the actuator to touch a upper surface of the disc cartridge with respect to the turntable while the disc cartridge is being loaded, the second roller being stopped to rotate after completion of the disc cartridge loading.

Further, the present invention achieves perfect clamping of the disc cartridge by clamping the upper surface of the disc cartridge by the clamper and the second roller.

What is claimed is:

1. A disc player comprising:
   a first opening formed on a panel for loading a first disc storage medium with a first diameter;
   a second opening formed on the panel for loading a second disc storage medium with a second diameter longer than the first diameter;
   a chassis provided in an orthogonal direction with respect to the panel;
   a turning frame mounted on the chassis and horizontally turnable between two predetermined positions;
   a first rotary unit provided on the turning frame to rotate the first disc storage medium;
   a second rotary unit provided on the turning frame to rotate the second disc storage medium; and
   a rotary mechanism for horizontally turning the turning frame to move at least either the first or the second rotary unit to a predetermined information reading position.

2. The disc player according to claim 1, wherein a central position of the first loading opening is displaced from a central position of the second loading opening, and the turning frame is horizontally turnable so that reading positions on the first and the second disc storage medium correspond to substantially central positions of the first and second loading openings, respectively.

3. The disc player according to claim 1 further comprising an optical pickup provided on the turning frame and movable between the first and the second rotary unit to read information on the first and the second disc storage medium.

4. The disc player according to claim 1, wherein the first disc storage medium is a minidisc and the second disc storage medium is a compact disc.

5. A disc player comprising:
   a first turntable on which a first disc storage medium with a first diameter is to be loaded;
   a second turntable on which a second disc storage medium with a second diameter longer than the first diameter is to be loaded; and
   a loading mechanism for loading the first and second disc storage media onto the first and second turntables, respectively;
   wherein the loading mechanism comprises:
      a first roller to transfer the second disc storage medium;
      a second roller to transfer the first disc storage medium, the second roller being provided as parallel to the first roller and within a lateral length of the first roller;

a holder to hold the first disc storage medium, the holder being provided as close to the first turntable from the second roller; and an actuator to actuate the first and second rollers.

6. The disc player according to claim 5, wherein the minidisc holder includes a shutter opening unit to open a shutter of a disc cartridge containing the first disc storage medium, the shutter opening unit being rotatable for being pushed in a predetermined direction while the disc cartridge is being loaded whereas being set at a waiting position while the disc cartridge is not loaded.

7. The disc player according to claim 5, wherein the second roller is rotated by the actuator to touch a upper surface of a disc cartridge containing the first disc storage medium with respect to the first turntable while the disc cartridge is being loaded, the second roller being stopped to rotate after completion of the disc cartridge loading, the second roller thus clamping the disc cartridge on the turntable side.

8. The disc player according to claim 5 further comprising a clamper, the second roller and the damper clamping a upper surface of a disc cartridge containing the first disc storage medium with respect to the first turntable while the disc cartridge is being loaded.

9. The disc player according to claim 5, wherein the first disc storage medium is a minidisc and the second disc storage medium is a compact disc.

10. A disc player comprising:

a first opening formed on a panel for loading a first disc storage medium with a first diameter;

a second opening formed on the panel for loading a second disc storage medium with a second diameter longer than the first diameter;

a chassis provided in an orthogonal direction with respect to the panel;

a turning frame horizontally turnably mounted on the chassis;

a first rotary unit provided on the turning frame to rotate the first disc storage medium;

a second rotary unit provided on the turning frame to rotate the second disc storage medium;

a rotary mechanism for horizontally turning the turning frame to move at least either the first or the second rotary unit to a predetermined information reading position; and a loading mechanism for loading the first and second disc storage media onto the first and second rotary units, respectively;

wherein the loading mechanism comprises:

a first roller to transfer the second disc storage medium;

a second roller to transfer the first disc storage medium, the second roller being provided as parallel to the first roller and within a lateral length of the first roller;

a holder to hold the first disc storage medium, the holder being provided as close to the first turntable from the second roller; and an actuator to actuate the first and second rollers.

* * * * *